Dec. 25, 1956  L. A. MEYER  2,775,072
BELT NOTCHING MACHINE
Filed April 15, 1952  4 Sheets-Sheet 1
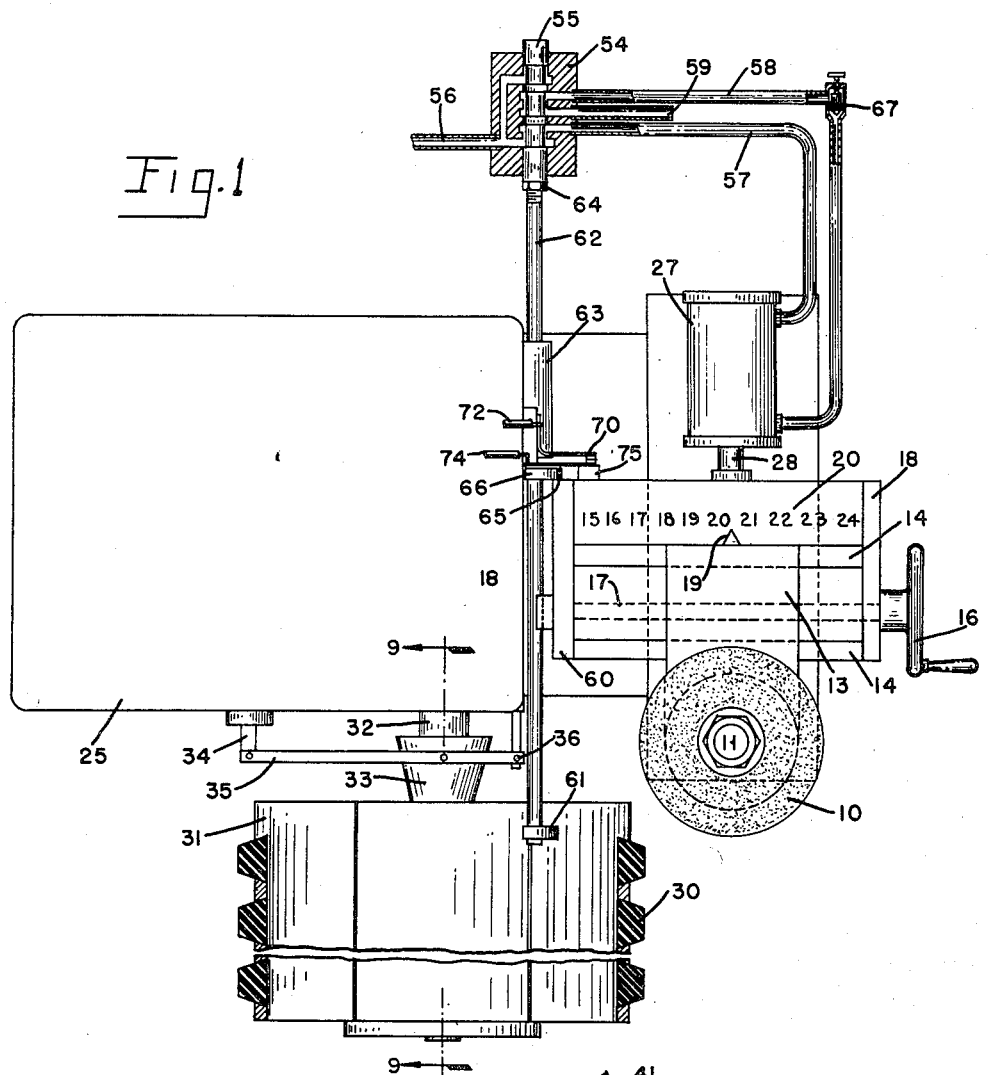
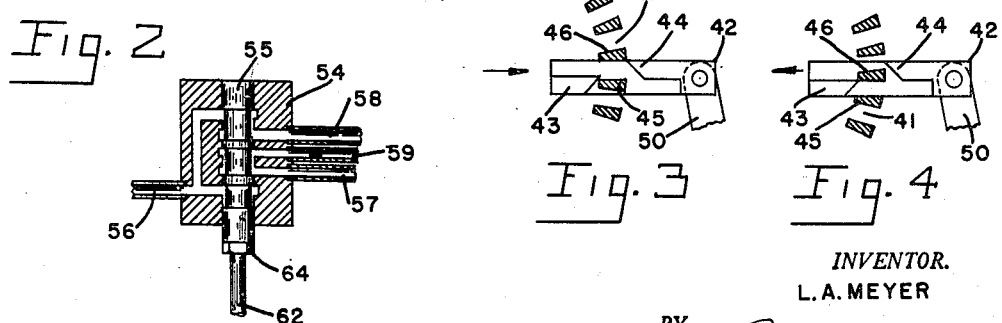
INVENTOR.
L. A. MEYER
BY
ATT'Y.

Dec. 25, 1956 L. A. MEYER 2,775,072
BELT NOTCHING MACHINE
Filed April 15, 1952 4 Sheets-Sheet 2
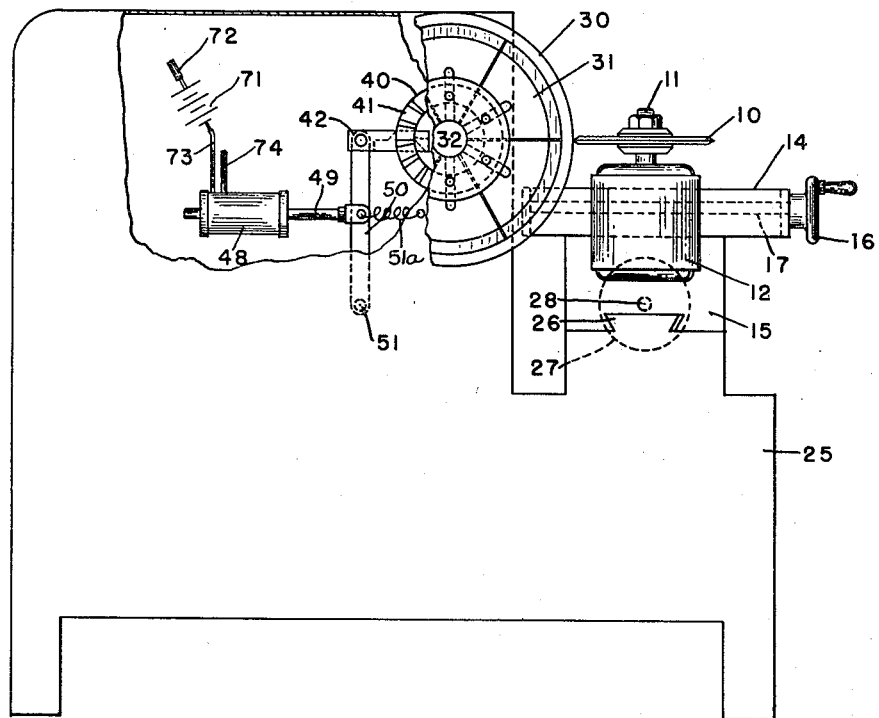
Fig. 5
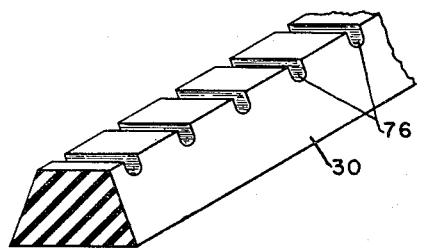
Fig. 6
INVENTOR.
L. A. MEYER
BY 
ATT'Y.

Dec. 25, 1956 L. A. MEYER 2,775,072
BELT NOTCHING MACHINE
Filed April 15, 1952 4 Sheets-Sheet 3
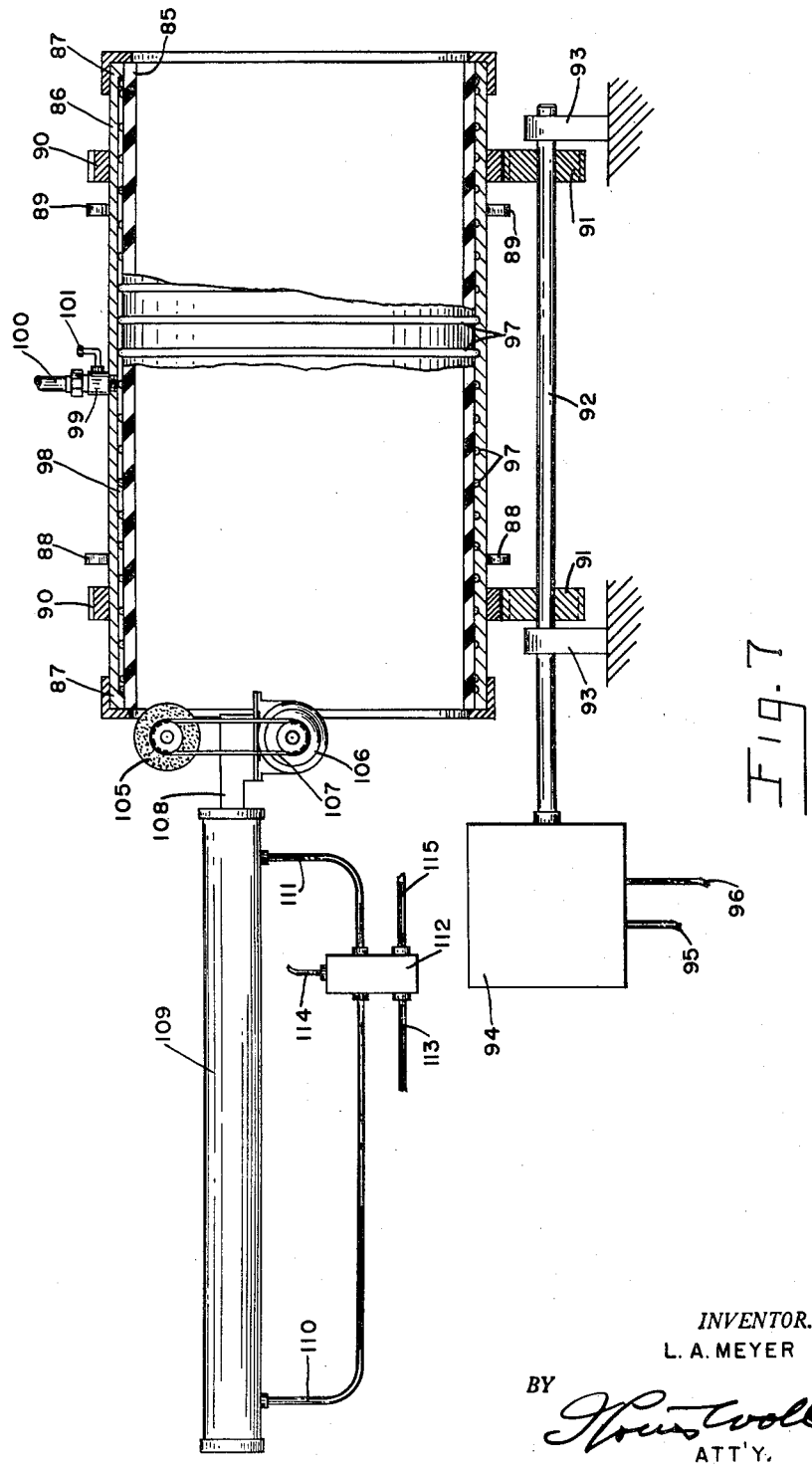
INVENTOR.
L. A. MEYER
BY
ATT'Y.

Dec. 25, 1956
L. A. MEYER
2,775,072
BELT NOTCHING MACHINE
Filed April 15, 1952
4 Sheets-Sheet 4
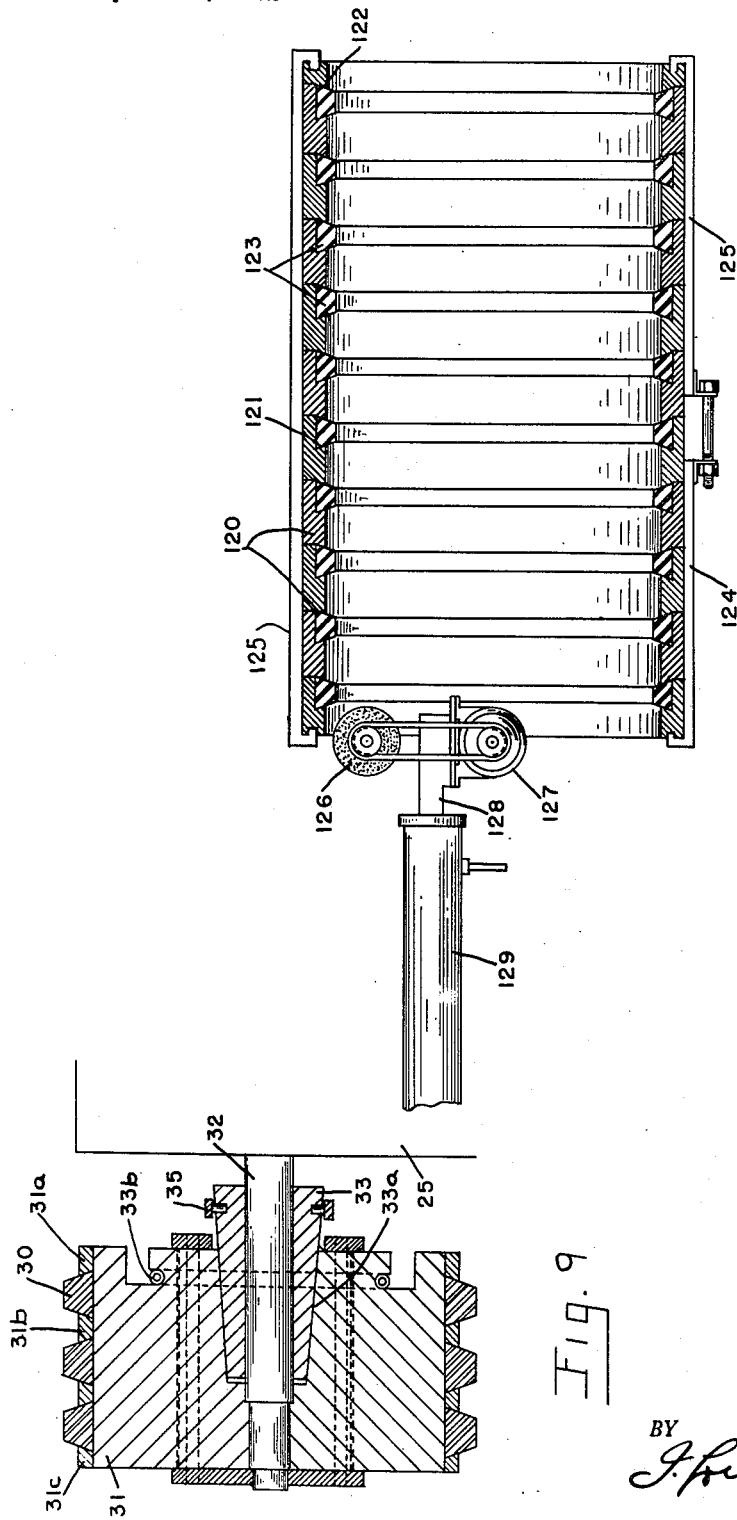
INVENTOR.
L. A. MEYER

United States Patent Office 2,775,072
Patented Dec. 25, 1956

2,775,072

BELT NOTCHING MACHINE

Lawrence A. Meyer, Dayton, Ohio, assignor to The Dayton Rubber Company, a corporation of Ohio Application April 15, 1952, Serial No. 282,310

11 Claims. (Cl. 51—34)

This invention relates to a device for notching strip materials such as belts which may be in endless form, and which device is particularly suitable for forming a series of transverse notches along the pulley side of V-belts.

It has been found desirable, in the case of V-belts, to provide the same with a series of transverse notches in order to render them more flexible and reduce the internal friction created within the belt as it is flexed upon passing around a pulley. By reducing the internal friction of the belt, less heat will be generated within the belt while it is running and its life will, therefore, be considerably prolonged.

In all of the prior art devices with which I am familiar for accomplishing this result such as those shown in Patent No. 2,401,905 to Slusher, the cutters for forming the notches in the belt have been in the form of sharpened knives which slit or groove the inner face of the belt at evenly spaced intervals around the circumference. Much trouble has been experienced in keeping these knives sharpened since the substantially continuous cutting action of the knives on the rubber and fabric of the belts causes them to rapidly lose their edge and become dull. Furthermore, it has been found that by using cutters in the form of knives there is a tendency for the edges of the fabric components of the belt to become frayed, and it has also been found that the cuts are frequently rough and not cleanly cut.

Accordingly, it is an object of the present invention to provide a new form of cutter for a belt notching machine which will have a longer life and require less attention than the cutters presently used in these machines.

More specifically, it is an object of the present invention to provide an abrasive type of cutter which will grind the notches in the belt and will give long and satisfactory service without an appreciable amount of attention except, perhaps, for an occasional dressing operation in order to maintain the contour of the cutter in the form desired. It will be observed that the shape, or profile, of the cutter will determine the shape, or profile, of the notch formed in the belt so that practically any shape of notch can be formed with but a single stroke of the cutter. The cuts or notches obtained by the use of the abrasive cutter referred to, can be obtained while operating the cutters at high speed, and the resulting cuts will be clean and free from frayed edges of fabric or rubber.

Another object of the invention is to provide a novel belt notching machine which will operate to provide notches in a belt in an automatic and continuous manner.

Another object of the invention is to provide a novel means for supporting the belts, or belt forming material, in the machine in position for notching. According to my invention, means is provided for securing the belts, or the belt sleeve, to the inner face of a hollow drum so that the notching cutter may work inside the drum and notch the inner peripheries of the belts or belt material. Thus, it will be unnecessary to invert the belt material or the belt after it has been notched as is the case when the same is supported on an expansible mandrel.

With these and other objects in view, which will become apparent from the following description, the invention includes certain novel features of construction and combinations of parts, the essential elements of which are set forth in the appended claims, and a preferred form or embodiment of which will hereinafter be described with reference to the drawings which accompany and form a part of this specification.

In the drawings:

Figure 1 is a top plan view of a belt notching machine embodying certain features of my invention.

Figure 2 is a fragmentary view showing the moved position of the reversing valve shown in Figure 1.

Figure 3 is a diagrammatic view illustrating the principle of operation of the indexing device.

Figure 4 is a diagrammatic view similar to Figure 3 but showing the parts in a moved position.

Figure 5 is a side elevation of the machine shown in Figure 1 with a portion of the machine cover broken away to show the indexing mechanism.

Figure 6 is a view showing a portion of a V-belt as it appears after being notched on the belt notching machine of Figures 1 to 5 inclusive.

Figure 7 is a view of a modified form of my invention.

Figure 8 is a view of a modified form of the machine shown in Figure 7.

Figure 9 is a view in cross section of the expansible mandrel taken along lines 9—9 of Figure 1.

As previously mentioned herein, I have discovered that superior results in the notching of reinforced rubber belts can be obtained by using an abrasive type cutter in place of the slitting or notching knives previously used for this purpose. The cutter may be formed by the usual process of mixing together the grains of a suitable abrasive with a binder and shaping the mass to provide a circular cutter having a profile corresponding to the shape of the notch to be formed in the belt. In the several embodiments of the invention disclosed herein, the cutter takes the form of a circular grinding wheel which is of suitable cross section to provide notches of the desired shape. It is to be realized, however, that other forms of cutters made up of bonded abrasive particles could be employed in place of the abrasive wheels if such is found necessary or desirable.

As shown in Figures 1 and 5, an abrasive type of cutter 10 is secured to the shaft 11 of an electric motor 12, which may be connected to a suitable source of electric current. The motor 12 is mounted on a cross-slide 13 (Figure 1) which is guided for transverse shifting movement on ways 14 carried by a crosshead 15 (Figure 5). The cross-slide 13 may be fed back and forth transversely of the direction of movement of the crosshead 15 by means of a handwheel 16 mounted on one end of a lead screw 17 which is journaled in the end frames 18 secured to the ways 14. The position of the cross-slide 13 on the ways 14 is indicated by an index 19 which cooperates with a scale 20 which is stationary with respect to the ways 14.

The crosshead 15 is mounted for reciprocation on a machine frame or base 25 by means of a dovetail slide arrangement 26 shown in Figure 5. Reciprocation of the crosshead 15 is accomplished by means of a double-acting hydraulic or air cylinder 27, shown in Figure 1, which is secured to the base 25 of the machine. The cylinder 27 has a piston rod 28 which is connected to the crosshead 15 so that by proper valving of fluid to the cylinder 27, the crosshead may be caused to move forward and backward relative to the base of the machine.

This movement of the crosshead will cause the cutter 10 to be traversed across the face of a plurality of inverted V-belts 30 which are supported side by side on an expansible mandrel 31. The expansible mandrel 31 is mounted on the end of shaft 32 journaled in the base of the machine. As shown in Figure 9, a slidable, tapered expander member 33 may be moved in or out of the mandrel to engage or release the belts 30 by means of a reciprocable plunger 34 which is pivotally connected to one end of an operating fork 35 rockable about a stationary pivot 36. The expansible mandrel which is of a conventional sectional construction having a plurality of inwardly extending segments, is expanded by engagement of tapered member 33 with a corresponding taper 33a formed internally of the mandrel thus forcing the sections outwardly and causing the required degree of expansion. The belts are maintained in alignment during the notching operation by means of clamping grooves formed by spacing rings 31a, 31b and 31c whose sidewalls are convergent toward their outer periphery, thus conforming in shape to and having their inclined surfaces contiguous with the sides of the belts as shown. The grooves thus formed are of a depth sufficient to firmly hold the belts in position during the notching operation but are sufficiently shallow to allow that portion of the belt which is to be notched to extend above their sides. The pie-shaped segments of the mandrel are retained radially by mens of a coil spring 33b. The belts are placed on the mandrel while it is in a collapsed or retracted position after which the mandrel is expanded and the belts are then firmly engaged for the notching operation.

For the purpose of advancing the belts 30 after each operation of the cutter 19, any suitable form of indexing mechanism may be provided for giving the shaft 32 an increment of movement after each operation of the cutter. One form of indexing mechanism which can be used for this purpose is shown in Figures 3, 4 and 5. In this mechanism, an indexing ring 40 having a number of radially milled slots 41 formed in the face thereof is secured to the shaft 32. The ring is advanced by a reciprocable dog 42 having cams 43 and 44 which are adapted to engage with the notches 41 and advance the ring one step for each complete reciprocation of the dog 42. The dog 42 may be made reciprocable, i. e., movable in alternating directions in substantially the same plane, by any well-known guiding means such as a longitudinal rib along the side of the dog moving in a cooperative stationary horizontal channel affixed to the machine frame. When the dog moves to the right as viewed in Figure 3, the cam 43 will engage the corner of a tooth 45 and give the ring one-half step of movement in a clockwise direction. Thereafter, when the dog is moved toward the left as viewed in Figure 4, the cam 44 will engage the corner of a tooth 46 and give the ring another half step of movement in a clockwise direction so as to complete the indexing movement of the ring.

Reciprocation of the dog 42 is effected by a solenoid 48 having an armature 49 which is pivotally connected to a lever 50 pivoted on the machine frame at 51. The upper end of the lever 50 is pivotally connected to the dog 42 so that each time the solenoid 48 is energized and de-energized, the dog 42 will be given one complete reciprocation and thereby index the shaft 32 through one step of movement.

To render the belt notching machine automatic in its operation, means is provided for automatically reversing the flow of fluid to the cylinder 27 after each stroke of the piston rod 28. As shown in Figures 1 and 2, flow of fluid to the cylinder is controlled by a valve 54 which is provided with a sliding spool or piston 55. When the piston is in the position shown in Figure 1 fluid under pressure in the line 56 will be directed into the upper end of the cylinder 27 through the line 57. At the same time, the lower end of the cylinder will be connected by a line 58 with an exhaust or return line 59. Hence, the piston rod 28 will be moved downwardly as viewed in Figure 1 so as to cause the cutter 10 to move across the face of the V-belt 30. As the piston rod 28 nears the end of its downward stroke, an abutment face 60 on the end frame 18 will strike against a collar 61 mounted on the end of a control rod 62. This rod is journaled for sliding movement in a bushing 63 secured to the machine base. At its upper end, the rod is connected, as at 64, to one end of the piston 55. Thus, when the crosshead 15 reaches the end of its forward stroke, the rod 62 will be drawn downwardly and the piston 55 will be moved from the position shown in Figure 1 to the position shown in Figure 2. In this position of the piston, fluid under pressure from the line 56 will be directed into the line 58, so that fluid under pressure will be caused to flow into the lower end of the cylinder 27, thus causing the piston to move upwardly and the crosshead 15 to be returned to the position shown in Figure 1. At the same time, the line 27 connected to the upper end of the cylinder will be communicatively connected with the exhaust or return line 59 so as to permit fluid to escape from the upper end of the cylinder as the piston rises. As the crosshead approaches the end of its stroke in the return direction, an abutment surface 65 on the end frame 18 will engage a collar 66 fast on the control rod 62 and cause the piston 55 to be returned to the position shown in Figure 1. As a result, the direction of operation of the cylinder 27 will be reversed and the cutter 10 will again be moved downwardly until it reaches the bottom of its stroke whereupon it will automatically be reversed and returned to its raised position. This operation will be repeated indefinitely as long as fluid under pressure is supplied to the line 56.

The speed of operation of the crosshead 15 may be controlled by a throttling valve 67 provided in the line 58. The needle of this valve may be adjusted until the crosshead is being reciprocated at the desired speed.

In order to cause the V-belts 30 to be indexed after each reciprocation of the cutter 10, a normally open switch 70 is provided in series with the energizing battery 71 (Figure 5) for the solenoid 48. As shown in Figures 1 and 5, one contact of the switch 70 is connected by a line 72 with one terminal of the battery 71, the other terminal of which is connected by a line 73 with one end of the solenoid winding. The other end of the solenoid winding is connected by a line 74 with the other contact of the switch 70. An abutment member 75, moving with the crosshead 15 is adapted to engage and close the switch 70, so that the solenoid 48 will be energized when the crosshead reaches the upper end of its stroke. This will cause the solenoid to be energized and dog 42 to be given one stroke of movement. However, engagement of abutment face 65 with the collar 66 on the control rod 62, will cause the piston 55 to be shifted to the position shown in Figure 1 so that a downward movement of the crosshead will be initiated. The switch 70 will therefore be permitted to return to its normally open position so as to de-energize the solenoid 48 to cause the dog 42 to be given the second part of its movement by the force of the spring 51a connecting the lever 50 to the machine frame 25. The V-belts 30 will therefore be indexed prior to the time that they are engaged by the cutter 10 during its downward travel. According to the above described operation of the machine, the belts 30 will be indexed only at the end of the upward stroke of the crosshead 15 so that but one notch will be cut in the belt for each complete reciprocation of the cutter 10. However, if desired, a second switch, like switch 70 may be connected in series with a second battery, like battery 71 and the solenoid 48. This switch may be placed below the crosshead and suitable means provided for causing the crosshead to close this second switch at the bottom of the downward movement of the crosshead. Provision of such a second switch will cause the belt to be indexed prior to the return movement of cutter 10 in the upward direction thereby advancing the belt to present an unnotched portion thereof to the cutter on its upward stroke. In this way, a notch may be cut in the belt on both the downward and upward strokes of the cutter thereby reducing the time required for completely notching the belts 30.

In Figure 6 is shown an example of the work performed by my novel form of belt notching machine employing an abrasive type cutter. As shown in this figure, the belts 30 have been provided with a series of lateral or transverse notches 76, the profile of which corresponds to the profile of the cutter 10. The depth of the notches 76 may be controlled by suitable adjustment of the hand wheel 16 (Figure 1) which shifts the cross-slide 13 transversely of the crosshead 15 so as to adjust the depth of cut produced by the cutter 10. The space between notches 76 is, of course, determined by the spacing of the notches 41 provided in the indexing ring 40. By providing interchangeable rings 40 having a greater or lesser number of notches than the ring 40, and by providing interchangeable dogs 42 to cooperate therewith, any desired spacing of notches 76 can be obtained.

Where the V-belts to be notched are of the raw edged type to be cut from a vulcanized sleeve, it may be found more advantageous to form the notches in the belt sleeve before it is cut into individual V-belts so as to avoid the necessity of handling each of the belts individually and notching them separately on a belt notching machine. Accordingly, I have devised a modified form of machine in which an abrasive type cutter may be employed for notching the interior face of a belt sleeve. As shown in Figure 7, a belt sleeve 85 is placed within a drum 86 having an inside diameter substantially equal to the outside diameter of the belt sleeve. The drum is reinforced at either end by a ring 87 and is supported for rotation about its longitudinal axis by two sets of rolls 88 and 89 spaced about the periphery of the drum. The drum may be rotated by means of ring gears 90 mounted on the drum which mesh with spur gears 91 secured to a shaft 92 journaled in brackets 93. The drum 86 may be indexed by means of an indexing mechanism 94 connected with one end of the shaft 92. This indexing mechanism may be of the same type as that shown in Figures 3, 4 and 5, having a notched indexing ring like the ring 40, an actuating dog like the dog 42, and a solenoid like the solenoid 48 for operating the actuating dog. A pair of lead wires 95 and 96 (Figure 7) from the solenoid may, if desired, be connected with a normally open switch similar to the switch 70 shown in Figure 1, which is adapted to be closed each time the notching cutter returns to its initial position.

For the purpose of securely holding the belt sleeve in position within the drum 86, the latter is provided with a series of spaced, annular grooves 97, which are interconnected with one another by means of a longitudinal groove 98 extending from the outermost annular groove at one end of the drum to the outermost annular groove at the other end of the drum. The longitudinal groove 98 is communicatively connected with a quick-disconnect type of hose fitting 99 so that a vacuum hose 100 may be selectively connected or disconnected with the drum and the grooves 97 and 98 as desired. The fitting 99 is also provided with a shut-off valve 101 so that the grooves 97 and 98 may be sealed off from the outside atmosphere before the hose 100 is disconnected from the drum. In this manner, the belt sleeve 85 may be securely held in place within the drum by connecting the vacuum hose 100 to the fitting 99 and opening the valve 101 so that air will be exhausted from the annular grooves 97. The valve 101 is then closed and the hose 100 disconnected so that the drum may be free to index from one position to another under the influence of the indexing mechanism 94.

In accordance with the teachings of my invention, an abrasive type cutter 105, having a profile corresponding to the shape of the notches desired, is mounted for rotation on an arbor and driven by an electric motor 106 which is drivingly connected with the cutter by means of a belt 107. The motor and cutter combination are mounted on the end of a ram 108 which constitutes the piston rod of a double-acting hydraulic or air cylinder 109 suitably supported on the frame of the machine. Opposite ends of the cylinder 109 are connected by lines 110 and 111 with the ports of valve 112 which may be similar to the valve 54 shown in Figures 1 and 2. Also connected to the valve is a fluid pressure line 113 which corresponds to the fluid pressure line 56 in Figures 1 and 2, and also with an exhaust, or return line 114, which corresponds to the exhaust or return line 59 in the Figure 1 embodiment of my invention. The valve 113 is provided with a piston similar to the piston 55 which may, if desired, be connected to a control rod 115 corresponding to the control rod 62. As in the Figure 1 embodiment, the control rod 115 may have collars fixed thereto, which are adapted to be engaged by abutment means carried by the ram 108 so as to cause the piston of valve 112 to be shifted at the conclusion of the forward and return strokes of the ram so as to cause automatic back and forth reciprocation of the cutter 105. Thus, the belt notching machine shown in Figure 7 may be rendered fully automatic in the same manner as the machine shown in Figures 1 to 5, inclusive, and will operate without any intervention on the part of the operator to completely notch the belt sleeve 85. After the sleeve has been completely notched, the operator may stop the machine by cutting off the supply of fluid under pressure to the line 113 and open the valve 101 to release the belt sleeve from the drum. The sleeve may then be removed and cut into a plurality of V-belts without any need of inverting the sleeve or belts since the notches are provided on the interior of the sleeve so that they will lie on the interior face of the cut belts.

A modified form of the invention shown in Figure 7 is illustrated in Figure 8 wherein means is provided for securing a plurality of V-belts to the inner face of a drum so that all of the belts may be simultaneously notched by the notching cutter. In this modified form of the invention, the drum is formed of a series of rings 120 each of which is provided along one edge of its inner face with a notch 121 shaped to correspond with a section of a V-belt. The opposite edge of each ring is provided with an inclined lip 122 which, when the rings are assembled together, will, with the notch 121 of an adjacent ring, form a clamping groove for receiving and securely holding a V-belt in position within the notching drum. As shown in Figure 8, a plurality of these rings 120 have been assembled together with a plurality of V-belts 123 clamped in position in the clamping grooves formed by notches 121 and lips 122. The rings 120 may be secured together by means of clamps 124 so as to form in effect, an integral drum 125 which may be mounted for rotation about its longitudinal axis and given indexing movement by the same type of indexing mechanism described in connection with the embodiments shown in Figures 1–5 and 7.

In accordance with the teachings of my invention, an abrasive type notching cutter 126 may be arranged to be driven by an electric motor 127, the cutter and motor combination being mounted on the end of a ram 128 corresponding to the ram 108 of Figure 7. This ram may be operated by a hydraulic or air cylinder 129, corresponding to the cylinder 109 of Figure 7, and the cylinder may be controlled by a valve corresponding to the valve 112, and automatic operation may be effected by providing a control rod corresponding to the control rod 115 of Figure 7.

The mechanism shown in Figure 8 provides novel means for enabling a plurality of V-belts to be simultaneously notched by an abrasive type cutter 126. The notches will be formed on the inner peripheries of the belts so that there will be no need of inverting the belts after the notching thereof has been completed.

Although I have described my invention in considerable detail and have, therefore, utilized certain specific terms and language herein, it is understood that the present disclosure is illustrative rather than restrictive and that changes and modifications may be resorted to without departing from the spirit or scope of the claims appended hereto.

I claim:

1. A V-belt notching machine comprising cylindrical supporting means for the material to be notched, a notching cutter of abrasive material mounted for movement axially of said support near the surface thereof, and traversing means for so moving said cutter, said cylindrical support having its supporting surface characterized by a plurality of continuous circumferential grooves conforming in cross-sectional shape to the base and a portion of the sides of a V-type belt to be held in place therein.

2. A belt notching machine according to claim 1 wherein said abrasive notching cutter comprises a rotary grinding wheel and including means for rotating said wheel while the same is moving axially of said support.

3. The belt notching machine of claim 1 including means for indexing said belt supporting means after each operation of said traversing means so as to advance an unnotched portion of the belt material into a position to be notched by said cutter on the next operation of said traversing means.

4. The belt notching machine of claim 3 wherein said traversing means includes a reversible, fluid-pressure motor.

5. The belt notching machine of claim 4 including means for automatically reversing said motor at the conclusion of each traversing movement of said cutter.

6. The belt notching machine of claim 5 including automatic means for actuating said indexing means after each operation of said traversing means.

7. A V-belt notching machine comprising a cylindrical support for the belt material to be notched, a rotatable notching cutter of abrasive material mounted for movement axially of said support near the surface thereof, means for imparting sliding movement of said cutter, means for rotating said cutter during said sliding movement; and a plurality of spacing rings whose sidewalls are convergent toward their outer periphery, said rings concentric with and adjacent to the outer surface of said support and spaced apart from each other along said surface so that the belt material may be placed between said rings, said sidewalls in supporting contact with the sides of said material.

8. The belt notching machine of claim 7 in which said supporting means includes an expansible mandrel in supporting engagement with said rings.

9. A belt notching machine comprising a hollow cylinder rotatably mounted for rotation about its longitudinal axis; means on said cylinder for securing endless cylindrical material to be notched to the inner face thereof including a series of interconnected grooves formed on the inner face of said cylinder, a disconnectable hose fitting mounted on the exterior face of said cylinder and communicatively connected with said grooves, and a shut-off valve on said fitting for sealing off the grooves from the outside atmosphere when said fitting is disconnected; a rotatable notching cutter positioned within said cylinder and positioned to engage said belt material for cutting transverse notches in the belt material, means for rotating said cutter, means for traversing said cutter back and forth across the belt material in a direction parallel to the axis of said cylinder, and means for indexing said cylinder about its axis after each operation of said traversing means so as to advance an unnotched portion of the belt material into position to be notched by said cutter on the next operation of said traversing means.

10. The belt notching machine of claim 9 in which said rotatable notching cutter comprises an abrasive wheel.

11. A belt notching machine comprising a hollow cylinder rotatably mounted for rotation about its longitudinal axis, said cylinder being formed of a series of abutting rings each having a continuous clamping groove formed on its inner face and along one edge thereof so as to provide, a plurality of continuous annular belt-clamping grooves on the inner face of the cylinder for holding a plurality of belts in place within said hollow cylinder, a rotatable notching cutter positioned within said cylinder and positioned to engage said belts for cutting transverse notches in the belts, means for rotating said cutter, means for traversing said cutter back and forth across the belts in a direction parallel to the axis of said hollow cylinder, and means for indexing said cylinder about its axis after each operation of said traversing means so as to advance an unnotched portion of the belt material into position to be notched by said cutter on the next operation of said traversing means.

References Cited in the file of this patent

UNITED STATES PATENTS

| Number | Name | Date |
|---|---|---|
| 1,328,953 | Garrison | Jan. 27, 1920 |
| 1,753,096 | Snarry | Apr. 1, 1930 |
| 1,909,398 | Garrison | May 16, 1933 |
| 1,927,098 | Miller | Sept. 19, 1933 |
| 1,963,756 | Merz | June 19, 1934 |
| 2,007,827 | Fletcher | July 9, 1935 |
| 2,022,061 | Tanner | Nov. 26, 1935 |
| 2,130,627 | Kelly | Sept. 20, 1938 |
| 2,410,905 | Slusher | Nov. 12, 1946 |

FOREIGN PATENTS

| Number | Country | Date |
|---|---|---|
| 413,420 | Great Britain | July 19, 1934 |